(Model.)

R. S. JUDSON.
Sweat-Scraper.

No. 227,362. Patented May 11, 1880.

Witnesses:
Clement M. Sites
M. M. Lacey

Inventor
Roswell S. Judson
By R. S. & M. Lacey Att'ys

UNITED STATES PATENT OFFICE.

ROSWELL S. JUDSON, OF MATTEAWAN, NEW YORK.

SWEAT-SCRAPER.

SPECIFICATION forming part of Letters Patent No. 227,362, dated May 11, 1880.

Application filed March 26, 1880. (Model.)

*To all whom it may concern:*

Be it known that I, ROSWELL S. JUDSON, a citizen of the United States, and resident at Matteawan, in the county of Dutchess and State of New York, have invented certain new and useful Improvements in Sweat-Scrapers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has for its object to furnish a device for scraping sweat, dirt, or other extraneous substances off horses and other animals.

It consists in a blade made of hard rubber or other suitable substance, which may be heated and set to any form, and which will retain this form when cold.

Figure 1:
Figure 2:
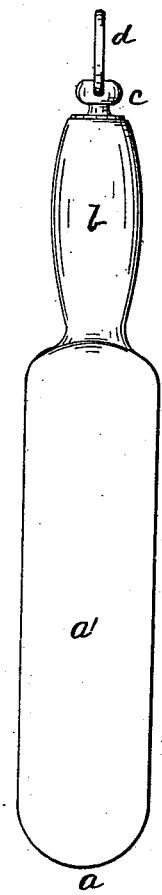
Figure 3:
Figure 4:
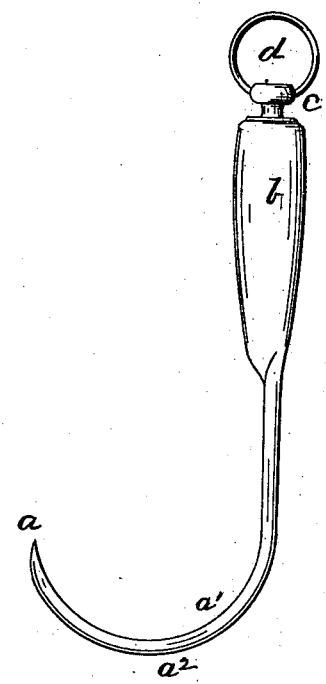

In the drawings, Figure 1 is a side view, having the handle in section. Fig. 2 is a front or face view. Fig. 3 is an edge view, showing the blade set straight; and Fig. 4 shows the blade set the form of a half-circle.

$a$ is the blade, which is made with a flat or straight face, $a'$, and a convex back, $a^2$. It is provided with a handle, $b$, made hollow, so as to provide a chamber, $b'$, designed to hold the blanket-pins.

The outer end of the chamber $b'$ is closed by a screw-plug, $c$, to which is affixed the ring $d$.

The scraper is made of hard rubber or other suitable material, the handle and blade being molded as one piece.

The blade may be placed in hot water and heated sufficiently so that it can be given any desired form, curved or straight, to adapt for use on any special part of the body of the animal.

This implement is specially adapted for use on horses undergoing severe training for speed. The animal, when being driven, becomes covered with perspiration, and when he is stopped it is desirable that the perspiration be removed as speedily as possible. Heretofore thin pieces of straight wood have been used for this purpose, and the same straight piece had to answer for all parts of the animal's body.

My device can be manufactured at small cost, made straight, and large numbers packed in small space for shipping.

The attendant of the horse can procure several of the scrapers, and can in a very little while set them for use on the different parts of the animal.

The device is light, and can be easily hooked to the belt of the attendant when attending the horse on the track.

The handle is made hollow, so that the blanket-pins can be carried therein and be preserved from being lost.

The end of the hollow handle is closed by the plug $c$, which has a ring, $d$, by which the device is attached to the belt of the hostler or hung up in the stable.

Having thus described my invention, what I claim, and desire to secure by Letters Patent, is—

The sweat-scraper, made of hard rubber, and composed of the blade $a$, handle $b$, having inner chamber, $b'$, and plug $c$, as a new article of manufacture, for the purposes set forth.

In testimony that I claim the foregoing I have hereunto set my hand and seal this 20th day of March, 1880.

ROSWELL SHERMAN JUDSON. [L. S.]

Witnesses:
C. H. HOYSRADT,
E. C. KENT.